US010606085B2

(12) United States Patent
Toyama

(10) Patent No.: US 10,606,085 B2
(45) Date of Patent: Mar. 31, 2020

(54) REALITY GLASSES HEADSET DEVICE

(71) Applicant: Tetsuo Toyama, Umea (SE)

(72) Inventor: Tetsuo Toyama, Umea (SE)

(*) Notice: Subject to any disclaimer, the term of this patent is extended or adjusted under 35 U.S.C. 154(b) by 0 days.

(21) Appl. No.: 16/195,873

(22) Filed: Nov. 20, 2018

(65) Prior Publication Data
US 2019/0155036 A1 May 23, 2019

Related U.S. Application Data

(60) Provisional application No. 62/590,049, filed on Nov. 22, 2017.

(51) Int. Cl.
G02B 27/01 (2006.01)
G06F 3/01 (2006.01)
G06F 1/16 (2006.01)

(52) U.S. Cl.
CPC ......... *G02B 27/0176* (2013.01); *G06F 1/163* (2013.01); *G06F 3/011* (2013.01); *G02B 2027/0169* (2013.01); *G02B 2027/0181* (2013.01); *G02B 2027/0185* (2013.01)

(58) Field of Classification Search
CPC .............. G02B 27/017; G02B 27/0172; G02B 27/0176; G02B 2027/0169; G02C 7/088; G06F 1/163; G06F 3/011
See application file for complete search history.

(56) References Cited

U.S. PATENT DOCUMENTS

| 5,943,165 | A  | * | 8/1999  | Huang ............... G02B 7/002 359/472 |
| 6,160,666 | A  | * | 12/2000 | Rallison ........... G02B 27/0101 345/7 |
| 9,274,340 | B2 | * | 3/2016  | Lyons ................ G02B 27/2228 |
| 9,989,998 | B1 | * | 6/2018  | Yee .......................... G06F 1/163 |
| 10,034,508 | B2 | * | 7/2018  | Frank .................. G02B 27/0176 |
| 10,048,503 | B2 | * | 8/2018  | Fujishiro ................ G06F 1/163 |
| 10,317,682 | B2 | * | 6/2019  | Drinkwater ........ G02B 27/0179 |
| 10,324,296 | B2 | * | 6/2019  | Mitani ............... G02B 27/0176 |
| 2015/0103152 | A1 | * | 4/2015  | Qin ........................ G02B 13/08 348/53 |
| 2018/0017796 | A1 | * | 1/2018  | Toso .................. G02B 27/0172 |
| 2018/0239416 | A1 | * | 8/2018  | Laskin .................... G06F 3/011 |

* cited by examiner

Primary Examiner — Laurence J Lee

(57) ABSTRACT

Disclosed is a reality glasses headset device for holding an electronic device without contacting the face of a user. The headset device includes a headband, first and second arms, and a holding unit to receive an electronic device. The headband is worn around the user's head. The headband includes a plurality of holes along a first side, and a second plurality of holes along a second, opposite side. The arms are configured to pivotably connect to holes on opposite sides of the headband. The holding unit includes a frame, a lens frame unit, a plurality of aspherical lenses, and an electronic device mounting unit. The frame has a left wall attached to the first arm, a right wall attached to the second arm, a top wall and a bottom wall. The arms are configured to maintain a position of the holding unit away from the user's face.

6 Claims, 3 Drawing Sheets

REALITY GLASSES HEADSET DEVICE

CROSS-REFERENCE TO RELATED APPLICATIONS

This application claims priority to U.S. Provisional Patent Application No. 62/590,049, filed on Nov. 22, 2017 on behalf of Tetsuo Toyama, the disclosure of which is incorporated herein by reference in its entirety.

BACKGROUND OF THE INVENTION

1. Field of the Invention

The present invention generally relates to a reality glasses headset device, and more particularly relates to a reality glasses headset device for holding an electronic device with limited contact to the face of the user.

2. Description of Related Art

Virtual reality (VR) and augmented reality (AR) systems are gaining in popularity and proving useful for many applications including gaming, entertainment, advertising, architecture and design, medical, sports, aviation, tactical, engineering, and military applications.

Virtual Reality (VR) systems have become commonplace in computer graphics research labs. This technology, however, has yet to achieve widespread consumer use. Most virtual reality systems employ specialized display systems such as "VR goggles", "VR helmets" and "heads-up displays" to achieve a greater sense of immersion into the virtual surroundings. Such a display system may be implemented as a helmet to continuously place a high-resolution display directly in front of a user's eyes.

Currently available VR headsets go all over the face of the user, and thus get really uncomfortable for the user. These VR headsets touch the face of the user and thus cannot be worn for pro-longed use. Therefore, there is a need of a reality glasses headset device for holding an electronic device with limited contact to the face of the user. Further, the reality glasses headset device should be comfortable to wear while having a space between the face of the user and the VR headset.

SUMMARY OF THE INVENTION

In accordance with teachings of the present invention, a reality glasses headset device for holding an electronic device with no contact to the face of the user is provided.

An object of the preset invention is to provide a reality glasses headset device for holding an electronic device with no contact to the face of the user. The reality glasses headset device includes a hollow headband, a first arm, a second arm and a holding unit. The hollow headband worn by the user around head. The hollow headband includes a first indent, and a second indent.

The first arm is attached to the first indent. The second arm is attached to the second indent. The first arm and the second arm is having a pivotal movement from the hollow headband. The holding unit is configured to cover eyes of the user with no contact to the face of the user. The holding unit is configured to receive the electronic device.

The holding unit includes a frame, a lens frame unit, plurality of aspherical lenses, and an electronic device mount unit. The frame having a left wall attached to the first arm, a right wall attached to the second arm, a top wall, a bottom wall. The bottom wall is having a nose cut-out to move above nose of the user.

The lens frame unit is configured to align between the left wall and the right wall. The plurality of aspherical lenses disposed on the lens frame unit to allow the user to view digital content displayed on the electronic device. The electronic device mount unit is attached to the lens frame unit.

The electronic device is disposed between the lens frame unit and the electronic device mount unit. The user views the digital content displayed on the electronic device through the aspherical lenses. The electronic device mount unit securely holds the electronic device on its position. The first arm and the second arm are configured to maintain the position of the holding unit away from the face of the user.

Another object of the present invention is to provide a first angle adjustment knob to secure the first arm in the first indent and a second angle adjustment knob to secure the second arm in the second indent. The first angle adjustment knob and the second angle adjustment knob allows the user to pivotally move the holding unit around the face of the user. Another object of the present invention is to provide a grip adjustment unit configured to allow adjustment of width of the hollow headband around the user's head.

Further features and advantages of the present invention, as well as the structure and operation of various embodiments of the present invention, are described in detail below with reference to the accompanying drawings.

DETAILED DESCRIPTION OF DRAWINGS

Figure 1:
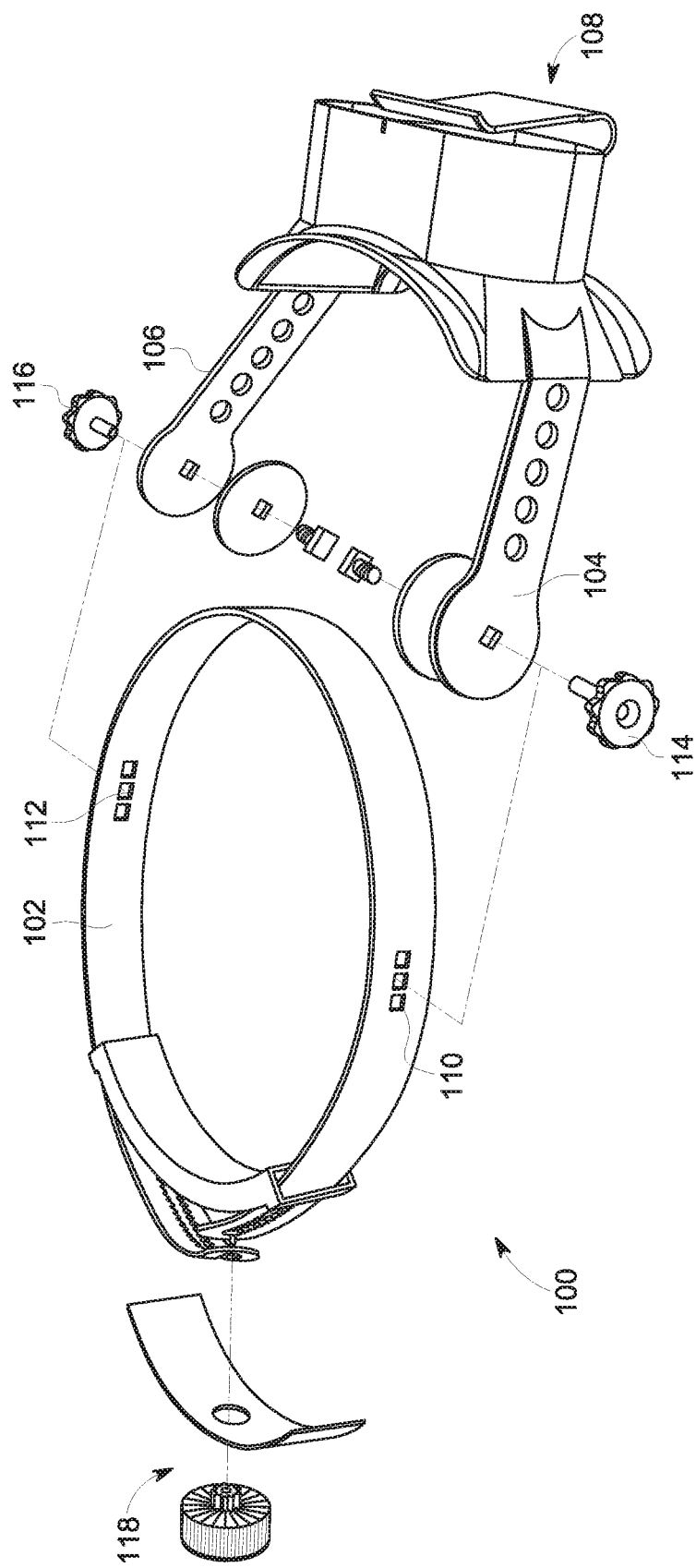
FIG. 1 illustrates an exploded view of a reality glasses headset device to hold reality glasses in accordance with a preferred embodiment of the present invention.

While this technology is illustrated and described in a preferred embodiment, a reality glasses headset device for holding an electronic device with no contact to face of a user may be produced in many different configurations forms, and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates an exploded view of a reality glasses headset device 100 to hold reality glasses in accordance with a preferred embodiment of the present invention. The headset device 100 includes a hollow headband 102, a first arm 104, a second arm 106 and a holding unit 108.

The hollow headband 102 to be worn by the user around head. The hollow headband 102 is having one or more first indents 110, and one or more second indents 112. The first arm 104 is attached to the first indent 110. The second arm 106 is attached to the second indent 112. The first arm 104 and the second arm 106 is having a pivotal movement from the hollow headband 102.

It would be readily apparent to those skilled in the art that the first arm 104 and the second arm 106 may be attached to any of the first indents 110 and the second indents 112, respectively to adjust the distance between face and the holding unit 108 without deviating from the scope of the present invention.

The holding unit 108 is configured to cover eyes of the user with no contact to the face of the user. The holding unit 108 is configured to receive the electronic device. The holding unit 108 is explained in detail in conjunction with FIG. 2 and FIG. 3 of the present invention.

In another preferred embodiment of the present invention, the reality glasses headset device 100 further includes a first angle adjustment knob 114, a second angle adjustment knob 116, and a grip adjustment unit 118. The first angle adjustment knob 114, the second angle adjustment knob 116 and the grip adjustment unit 118 is explained in detail in conjunction with FIG. 2 and FIG. 3 of the present invention.

The first angle adjustment knob 114 is to secure the first arm 104 in the first indent 110. The second angle adjustment knob 116 is to secure the second arm 106 in the second indent 112. The first angle adjustment knob 114 and the second angle adjustment knob 116 allows the user to pivotally move the holding unit 108 around the face of the user.

Figure 2:
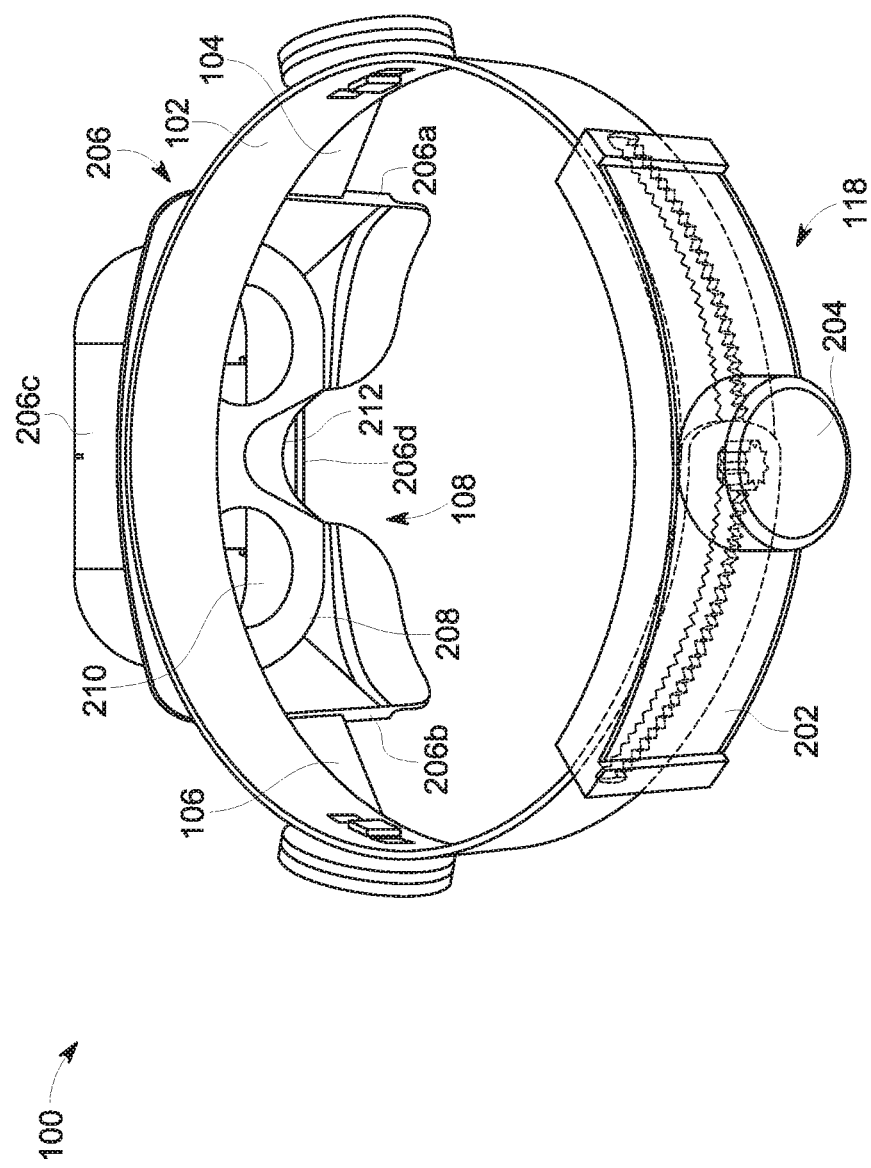
FIG. 2 illustrates a rear perspective view of the reality glasses headset device to show a grip adjustment knob in accordance with another preferred embodiment of the present invention.

FIG. 2 illustrates a rear perspective view of the reality glasses headset device 100 to show a grip adjustment unit 118 in accordance with another preferred embodiment of the present invention. The grip adjustment unit 118 is configured to allow adjustment of width of the hollow headband 102 around the user's head.

In a preferred embodiment of the present invention, the grip adjustment unit 118 having a ratchet mechanism to adjust width of the hollow headband 102 around the user's head. Generally, the ratchet mechanism includes a strap 202 where the ends of the strap are connected. The ratchet mechanism operates on a gear and teeth arrangement on the strap 202.

The grip adjustment unit 118 further includes a ratchet adjustment knob 204 that is attached to the strap 202 at one end a set of cog teeth. The size of the strap 202 may be adjusted by turning the ratchet adjustment knob 204 in one direction to pull the strap ends closer together or turning the ratchet adjustment knob 204 the other direction to force the ends apart. It would be readily apparent to those skilled in the art that various other ways may be envisioned to create the grip adjustment unit 118 without deviating from the scope of the present invention.

Figure 3:
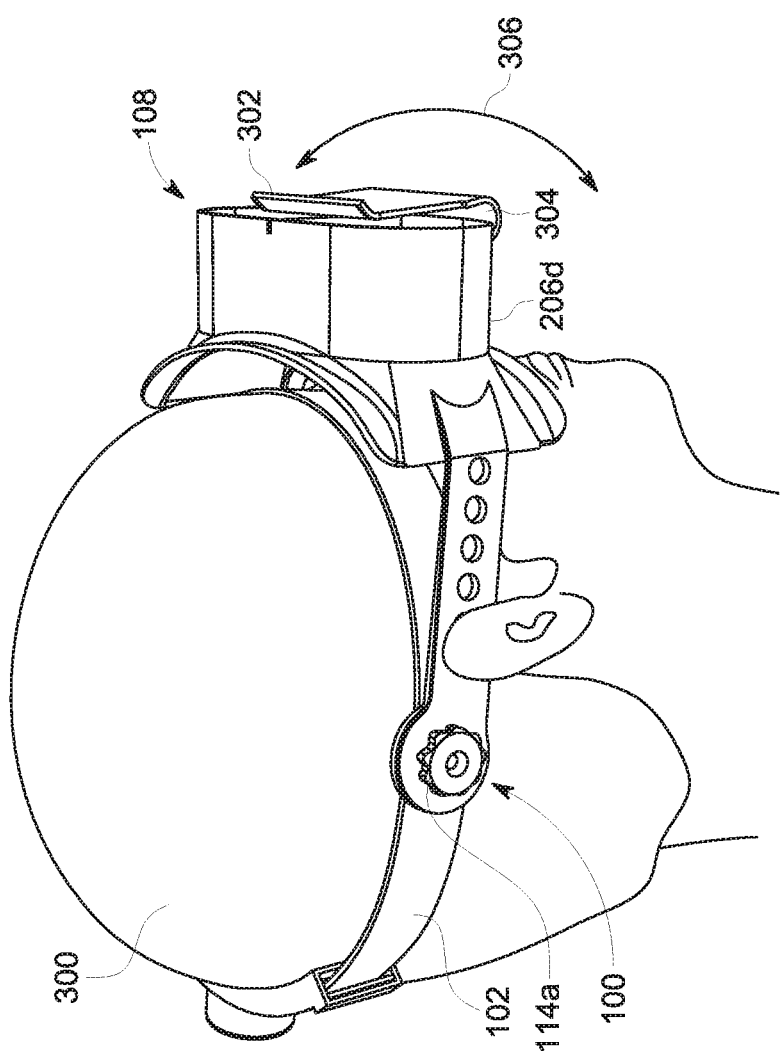
FIG. 3 illustrates a side perspective view of the reality glasses headset device worn by the user in accordance with another preferred embodiment of the present invention.

The holding unit 108 includes a frame 206, a lens frame unit 208, plurality of aspherical lenses 210, and an electronic device mount (explained in FIG. 3). The frame 206 includes a right wall 206a which is attached to the first arm 104, a left wall 206b which is attached to the second arm 106, a top wall 206c which is attached to the right wall 206a and the left wall 206b; and a bottom wall 206d. The bottom wall 206d is having a nose cut-out 212 to move above nose of the user The lens frame unit 208 is configured within the frame 206 to align between the left wall 206b and the right wall 206a. The plurality of aspherical lenses 210 is disposed on the lens frame unit 208 to allow the user to view digital content displayed on the electronic device. It may be envisioned to those skilled in the art that various shapes and sizes of the lens frame unit 208 and the aspherical lenses 210 may be configured without deviating from the scope of the present invention.

FIG. 3 illustrates a side perspective view of the reality glasses headset device 100 worn by the user 300 in accordance with another preferred embodiment of the present invention. The reality glasses headset device 100 includes an electronic device mount 302 attached to the bottom wall 206d and acts as a rear wall of the holding unit 108 to cover the lens frame unit (208, shown in FIG. 2).

The electronic device mount 302 has an opening 304 to receive the electronic device. The electronic device display screen faces the lens frame unit (208, shown in FIG. 2) such that the user looks through the aspherical lenses (210, as shown in FIG. 2). As shown in FIG. 3, the user is able to move the holding unit 108 by adjusting the first angle adjustment knob 114a in a preferred embodiment of the present invention.

Double sided Arrow 306 shows the movement of the holding unit 108. The first angle adjustment knob 114 is able to move up and down the holding unit 108. It would be readily apparent to those skilled in the art that the holding unit 108 may be moved up and down using the second angle adjustment knob (116, shown in FIG. 1).

Further, the FIG. 3 shows the distance between face of the user 300 and the holding unit 108. The headband 102 is tied around head of the user 300. The first arm 104 extends out from the headband 102 and thus the holding unit 108 has no direct contact with the face. It is comfortable for the user 300 to watch the digital content on the display screen of the electronic device without having direct contact with the face.

It would be recommended to use a hair cover or hair band to absorb sweat of the user. Thus, in case the reality glasses headset device requires to be shared, the other person should not be affected by the sweat of first user.

The present invention offers various advantages such as providing a VR headset for pro-longed use even while exercising or sweating. The reality glasses headset device is able to provide VR experience with less pressure on the face. The reality glasses headset device has designed to maintain a significant distance between the face and the VR headset, thus making it easier to be used for longer duration.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

The invention claimed is:

1. A reality glasses headset device for holding an electronic device without contacting the face of a user, the headset device comprising:
 a headband to be worn by the user around the user's head, the headband having one or more first holes on a first side of the headband, and one or more second holes on a second, opposite, side of the headband;
 a first arm attached to at least one of the one or more first holes;

a second arm attached to at least one of the one or more second holes, wherein the first arm and the second arm are pivotably attached to the headband;

a holding unit configured to cover the eyes of the user without contacting the face of the user and configured to receive the electronic device, the holding unit comprising:

a frame comprising: a right wall attached to the first arm; a left wall attached to the second arm; a top wall attached to the right wall and the left wall; and a bottom wall having a nose cut-out to avoid contact with the nose of the user;

a lens frame unit configured within the frame and aligned between the left wall and the right wall;

a plurality of aspherical lenses disposed on the lens frame unit to allow the user to view digital content displayed on the electronic device; and an electronic device mount attached to the lens frame unit, wherein the electronic device is disposed between the lens frame unit and the electronic device mount, wherein the user views the digital content displayed on the electronic device through the aspherical lenses; wherein the electronic device mount securely holds the electronic device in a fixed position;

wherein the first arm and the second arm are configured to maintain the position of the holding unit away from the face of the user.

2. The reality glasses headset device according to claim 1 further comprising:

a first angle adjustment knob that detachably secures the first arm in the one or more first holes; and a second angle adjustment knob detachably secures the second arm in the one or more second holes;

wherein the first angle adjustment knob and the second angle adjustment knob allow the user to pivotably move the holding unit around the face of the user.

3. The reality glasses headset device according to claim 2 wherein the first angle adjustment knob allows the first arm to attach to any of the one or more first holes depending upon the requirement of distance between the user's face and the holding unit.

4. The reality glasses headset device according to claim 2 wherein the second angle adjustment knob allows the second arm to attach to any of the one or more second holes depending upon the requirement of distance between the user's face and the holding unit.

5. The reality glasses headset device according to claim 1 further comprising a grip adjustment unit configured to adjustably connect the ends of the headband within a strap.

6. The reality glasses headset device according to claim 5 wherein the grip adjustment unit comprises a ratchet mechanism to adjust the length of the headband around the user's head.

* * * * *